(12) United States Patent
Ando et al.

(10) Patent No.: US 8,295,321 B2
(45) Date of Patent: Oct. 23, 2012

(54) LASER LIGHT SOURCE

(75) Inventors: Taro Ando, Hamamatsu (JP); Haruyasu Ito, Hamamatsu (JP); Yoshiyuki Ohtake, Hamamatsu (JP); Takashi Inoue, Hamamatsu (JP); Naoya Matsumoto, Hamamatsu (JP); Norihiro Fukuchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/991,268

(22) PCT Filed: May 21, 2009

(86) PCT No.: PCT/JP2009/059355
§ 371 (c)(1),
(2), (4) Date: Nov. 5, 2010

(87) PCT Pub. No.: WO2009/145107
PCT Pub. Date: Dec. 3, 2009

(65) Prior Publication Data
US 2011/0064113 A1      Mar. 17, 2011

(30) Foreign Application Priority Data

May 29, 2008   (JP) ................................ 2008-141184

(51) Int. Cl.
*H01S 3/13*   (2006.01)
*H01S 3/082*   (2006.01)
*H01S 3/08*   (2006.01)

(52) U.S. Cl. .......... 372/99; 372/29.023; 372/31; 372/97

(58) Field of Classification Search ............. 372/29.023, 372/31, 97, 99
See application file for complete search history.

(56) References Cited

U.S. PATENT DOCUMENTS 6,163,558 A * 12/2000 Hiiro ............................... 372/99

FOREIGN PATENT DOCUMENTS

| JP | 63-265479 | 11/1988 |
|---|---|---|
| JP | 3-46286 | 2/1991 |
| JP | 04-068582 | 3/1992 |
| JP | 2000-12955 | 1/2000 |
| JP | 2000-91681 | 3/2000 |
| JP | 2001-523396 | 11/2001 |
| JP | 2006-196638 | 7/2006 |
| WO | 98/50986 | 11/1998 |

* cited by examiner

*Primary Examiner* — Armando Rodriguez
(74) *Attorney, Agent, or Firm* — Drinker Biddle & Reath LLP

(57) ABSTRACT

A laser light source 1 is provided with a first reflection mirror 11, a laser medium 12, an aperture 13, an output mirror 14, a half mirror 15, a light beam diameter adjuster 16, and a second reflection mirror 17, and outputs laser oscillation light 31 reflected by the half mirror 15 to the outside. The main resonator is composed by the first reflection mirror 11 and the output mirror 14 disposed so as to be opposed to each other with the laser medium 12 placed therebetween. The external resonator is composed by the output mirror 14 and the second reflection mirror 17 disposed so as to be opposed to each other. The second reflection mirror 17 is configured such that it gives amplitude or phase variations to respective positions in the section of a light beam when the light is reflected, the second reflection mirror presents an amplitude or phase variation distribution, and determines the transverse mode of the laser oscillation light 31 based on the amplitude or phase variation distribution. Thus, a laser light source capable of easily controlling the transverse mode of the laser oscillation light can be realized.

9 Claims, 12 Drawing Sheets

(a) n=1,m=2  (b) n=2,m=2  (c) p=3,k=0

Fig.4
(a)
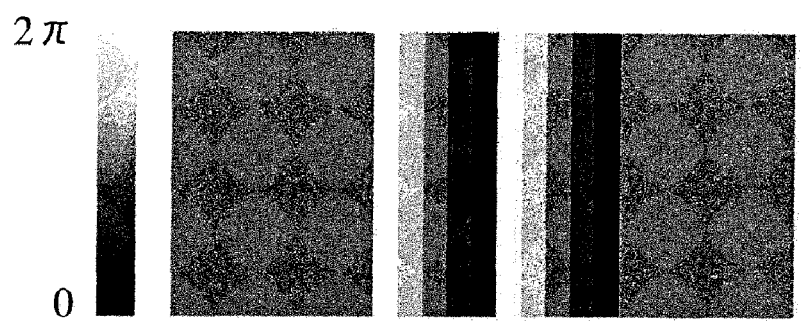
(b)
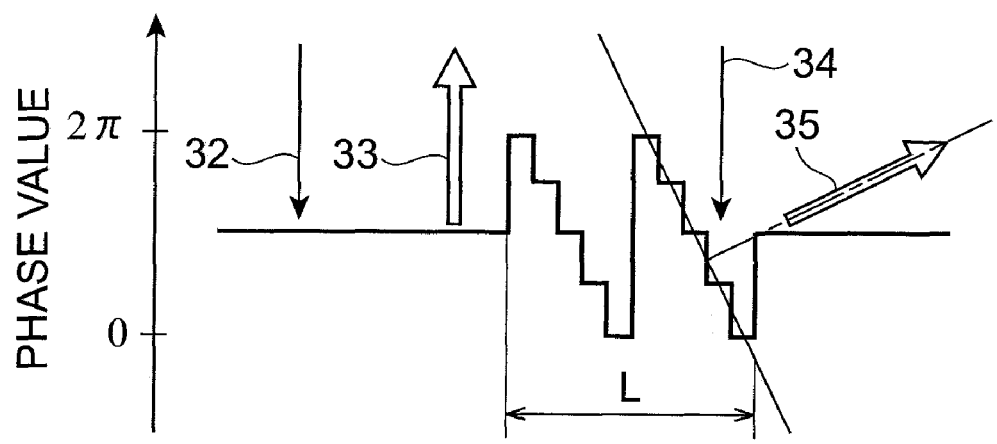

LASER LIGHT SOURCE

TECHNICAL FIELD

The present invention relates to a laser light source.

BACKGROUND ART

In a laser light source provided with a laser resonator configured so that a reflection mirror and an output mirror are disposed so as to be opposed to each other with a laser medium placed therebetween, stimulated emission light emitted from an excited laser medium is reflected by the reflection mirror, while a part of the stimulated emission light passes through the output mirror and the remaining part thereof is reflected therefrom. Laser oscillation is produced by reciprocation of the stimulated emission light between the reflection mirror and the output mirror. Laser oscillation light which passes through the output mirror and is output to the outside generally becomes such that some transverse modes are overlapped thereon.

However, in accordance with usage, there are cases where it is required that the laser oscillation light output from the laser light source is subjected to only the fundamental mode as the transverse mode, or, there are cases where it is required that the laser oscillation light is subjected to only another specific transverse mode.

The invention disclosed in Patent Document 1 intends that the laser oscillation light of a specific transverse mode is selectively output from a laser resonator. The laser light source disclosed in this document is provided with a discontinuous phase element on the resonance light path in the laser resonator. The discontinuous phase element gives phase variations to respective positions in the section of a light beam for the stimulated emission light reciprocating in the laser resonator. The discontinuous phase element has a thickness distribution and gives a phase variation distribution corresponding to the thickness distribution to the stimulated emission light, wherein the transverse mode of the laser oscillation light is determined.

CITATION LIST

Patent Literature

Patent Document 1: Japanese Translation of PCT International Application (Kohyo) No. 2001-523396

SUMMARY OF INVENTION

Technical Problem

However, since, in the laser light source disclosed in Patent Document 1, the phase variation distribution given to the stimulated emission light by the discontinuous phase element is fixed, dynamic control of the transverse mode of the laser oscillation light is impossible. Therefore, since the phase variation distribution given to the stimulated emission light cannot be adjusted, there are cases where the laser oscillation light of a specific transverse mode cannot be efficiently obtained. Further, although it is necessary to replace a discontinuous phase element, which is inserted into the laser resonator, in order to change the transverse mode of the laser oscillation light, generally it is not easy to replace the same because fine optical re-adjustment is required with replacement of the element.

The present invention has been developed in order to solve the above-described problems, and it is therefore an object of the invention to provide a laser light source which is capable of easily controlling the transverse mode of laser oscillation light.

Solution to Problem

A laser light source according to the present invention is provided with (1) a main resonator configured so that a first reflection mirror and an output mirror are disposed so as to be opposed to each other with a laser medium placed therebetween, and (2) an external resonator configured so that the output mirror and a second reflection mirror are disposed so as to be opposed to each other, which is optically coupled to the main resonator via the output mirror. Further, the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution. In the laser light source according to the invention, since the amplitude or phase variation distribution is presented in the second reflection mirror, the transverse mode of the stimulated emission light efficiently generated in the main resonator and the external resonator of the laser light source is determined, and the laser oscillation light of the transverse mode is output to the outside.

Advantageous Effects of Invention

The laser light source according to the present invention can easily control the transverse mode of laser oscillation light.

BRIEF DESCRIPTION OF DRAWINGS

FIG. 4 is a diagram showing an example of a phase variation distribution in a loss region of the phase variation distribution presented in the second reflection mirror 17 included in the laser light source 1 according to the first embodiment.

DESCRIPTION OF EMBODIMENTS

Hereinafter, a detailed description is given of embodiments for carrying out the present invention with reference to the accompanying drawings. The same elements will be denoted by the same reference symbols in the description of the drawings, and overlapping description thereof will be omitted.

First Embodiment

Figure 1:
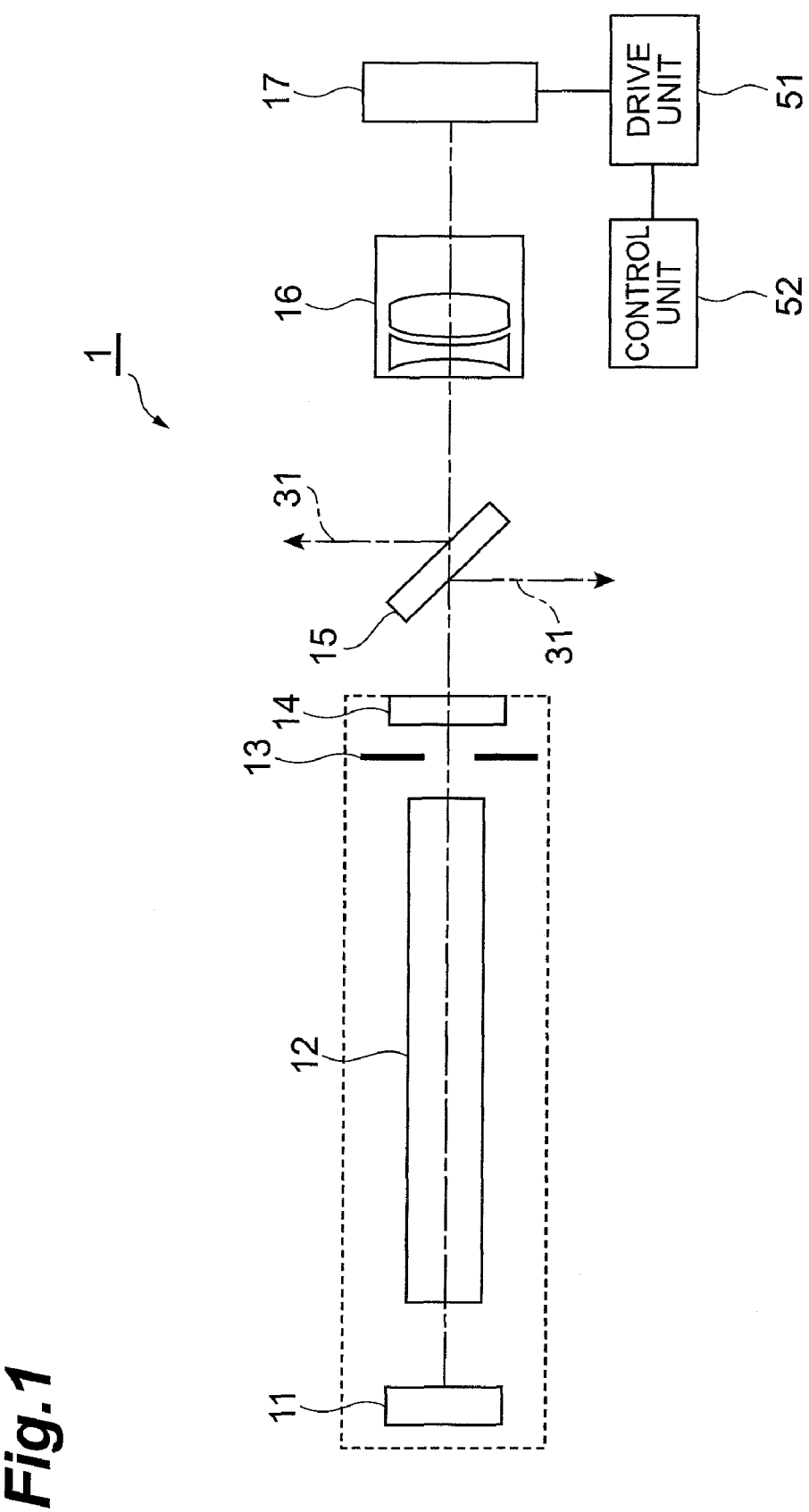
FIG. 1 is a configuration diagram of a laser light source 1 according to a first embodiment.

FIG. 1 is a configuration diagram of a laser light source 1 according to a first embodiment. The laser light source 1 shown in this figure is provided with a first reflection mirror 11, a laser medium 12, an aperture 13, an output mirror 14, a half mirror 15, a light beam diameter adjuster 16 and a second reflection mirror 17, and outputs laser oscillation light 31 reflected by the half mirror 15 to the outside.

The main resonator is configured so that the first reflection mirror 11 and the output mirror 14 are disposed so as to be opposed to each other with the laser medium 12 placed therebetween. Also, the external resonator is configured so that the output mirror 14 and the second reflection mirror 17 are disposed so as to be opposed to each other. The external resonator and the main resonator are optically coupled to each other via the output mirror 14.

The laser medium 12 is excited to an upper energy level by supplying excitation energy, and emits light at the time of transition from the upper energy level to a lower energy level. The laser medium 12 may be a gas such as Ar gas, He—Ne gas, $CO_2$ gas, etc., or may be a liquid such as an organic solvent containing a dye molecule, or may be a solid substance such as Nd:YAG etc., or further may be a laser diode.

It is required that the first reflection mirror 11 has a high reflectance at the wavelength of the laser oscillation light 31. It is preferable that, in order to efficiently produce the laser oscillation, the reflection surface of the first reflection mirror 11 is made into a concave surface having a specific curvature (for example, 15 m). The output mirror 14 transmits a part of incident light and reflects the remaining part thereof.

It is required that the second reflection mirror 17 has a high reflectance at the wavelength of the laser oscillation light 31. The second reflection mirror 17 is configured such that it gives amplitude or phase variations responsive to respective positions in the section of a light beam when the light is reflected, the second reflection mirror presents an amplitude or phase variation distribution, and determines the transverse mode of the laser oscillation light 31 based on the amplitude or phase variation distribution. In the second reflection mirror 17, the presented amplitude or phase variation distribution may be fixed, however, it is preferable that the amplitude or phase variation distribution is presented in accordance with control from the outside.

The second reflection mirror 17 may be a spatial light modulator (hereinafter called "SLM") which spatially modulates the amplitude or the phase of the incident light and reflects the incident light, or may be a segment type deformable mirror or a MEMS element which spatially modulates the phase of the incident light and reflects the incident light.

Also, it is preferable that the second reflection mirror 17 is an LCOS (Liquid Crystal on Silicon) type SLM among the SLMs.

The LCOS type SLM has features such as a high reflectance, a high phase modulation rate, and a small size, etc., and spatially modulates the phase of the incident light and reflects the incident light. In addition, it is preferable that the reflection surface of the second reflection mirror 17 is coated for reflection so as to have a high reflectance with respect to the wavelength of the laser oscillation light 31, wherein a reflectance of approximately 90% can be brought about. Further, in the following description, a description of embodiments is mainly base on that the second reflection mirror 17 is an LCOS type SLM.

In the case where the second reflection mirror 17 presents an amplitude or phase variation distribution in accordance with control from the outside, as schematically shown in FIG. 1, a drive unit 51 which drives the second reflection mirror 17, and a control unit 52 which controls the amplitude or phase variation distribution to be presented in the second reflection mirror 17 via the drive unit 51 are provided. The control unit 52 is, for example, a personal computer.

The half mirror 15 is provided on the light path in the external resonator, transmits a part of the incident light, and reflects the remaining part thereof. The reflected light is made into the laser oscillation light 31 output from the laser light source 1.

It is preferable that the light beam diameter adjuster 16 is provided on the resonance light path in the main resonator or in the external resonator. The light beam diameter adjuster 16 adjusts the beam diameter of light incident on the second reflection mirror 17, and for example, the adjuster is composed to include two lenses and is installed on the light path between the half mirror 15 and the second reflection mirror 17. The light beam diameter adjuster 16 increases the light beam diameter on the light path between the light beam diameter adjuster 16 and the second reflection mirror 17 in comparison with the light beam diameter on the light path between the output mirror 14 and the light beam diameter adjuster 16. Since, by the light beam diameter adjuster 16 provided, it is possible to make light incident into a region where the phase can be modulated in the second reflection mirror 17, and the region where the phase can be modulated can be effectively utilized. Also, if the resolution of the second reflection mirror 17 is sufficient in view of generating a desired transverse mode, the light beam diameter adjuster 16 is not required.

In addition, it is preferable that the aperture 13 is provided on the resonance light path in the main resonator or in the external resonator. The aperture 13 restricts the beam diameter of light incident on the second reflection mirror 17, and is provided, for example, on the light path between the laser medium 12 and the output mirror 14. The aperture 13 prevents generation of unintended and unnecessary transverse mode light from occurring. In addition, in the case where it is not necessary to prevent generation of unintended transverse mode light from occurring, the aperture 13 is not required.

The operation of the laser light source 1 is as follows. When excitation energy is supplied to the laser medium 12, the laser medium 12 is excited to the upper energy level, and light is emitted from the laser medium 12 at the time of transition from the upper energy level to the lower energy level. While the light emitted from the laser medium 12 is reflected by the first reflection mirror 11, a part thereof is transmitted through the output mirror 14 and the remaining part thereof is reflected. By the light reciprocating between the first reflection mirror 11 and the output mirror 14, the light interacts with the laser medium 12, and the stimulated emission light is generated by the laser medium 12.

The stimulated emission light, which is transmitted through the output mirror 14 from the interior of the main resonator and is inputted into the external resonator, reciprocates between the output mirror 14 and the second reflection mirror 17, wherein a part thereof is transmitted through the output mirror 14 and is inputted into the main resonator, and another part thereof is reflected by the half mirror 15 and is output to the outside as the laser oscillation light 31.

In addition, the beam diameter of the light incident on the second reflection mirror 17 in the external resonator is enlarged by the light beam diameter adjuster 16, and the beam diameter thereof is restricted by the aperture 13. In the second reflection mirror 17, the amplitude or phase variation distribution is presented. Then, when the light incident on the second reflection mirror 17 is reflected by the second reflection mirror 17, amplitude or phase variation amounts, which are responsive to respective positions in the section of the light beam, are given to the reflected light. Further, in the case where the second reflection mirror 17 is an LCOS type SLM, phase variation amounts responsive to respective positions in the section of the light beam are given to the reflected light. Then, the transverse mode of the laser oscillation light 31 is determined based on the variation distribution.

In the laser light source 1 according to the present embodiment, the external resonator having traverse mode selectivity, which is configured as described above, is coupled to the main resonator with respect to the spatial mode. The coupling is achieved by setting so that the beam waist of stimulated emission light in the main resonator is placed roughly at the position of the output mirror 14. For example, the first reflection mirror 11 is made into a concave mirror, and the distance between the first reflection mirror 11 and the output mirror 14 may be made substantially equal to the curvature radius of the concave surface of the first reflection mirror 11. As a result, the transverse mode in the main resonator becomes the same as the transverse mode selected in the external resonator, and the laser oscillation light 31 having the desired transverse mode is obtained as the entirety of the laser light source 1.

It is preferable that the second reflection mirror 17 presents the amplitude or phase variation distribution to cause the Laguerre-Gauss mode light (hereinafter called "LG mode light") to be subjected to laser oscillation, and it is also preferable that the second reflection mirror presents the amplitude or phase variation distribution to cause the Hermite-Gauss mode light (hereinafter called "HG mode light") to be subjected to laser oscillation. The LG mode and the HG mode, respectively, are representative examples of the transverse mode which is an electric field amplitude pattern of light on the light beam section perpendicular to the light traveling direction.

The LG mode is a transverse mode of laser oscillation light, which can be frequently observed in the case where the sectional shape of the laser medium 12 is circular, and is specified by a radial index p and an angular index k. Hereinafter, the LG mode in which the radial index is p and the angular index is k is expressed to be LG(p,k). On the other hand, the HG mode is a transverse mode of laser oscillation light which can be frequently observed in the case where the sectional shape of the laser medium 12 is rectangular, and is specified by two indexes n and m. Hereinafter, the HG mode of the indexes n and m is expressed to be HG(n,m).

Figure 2:
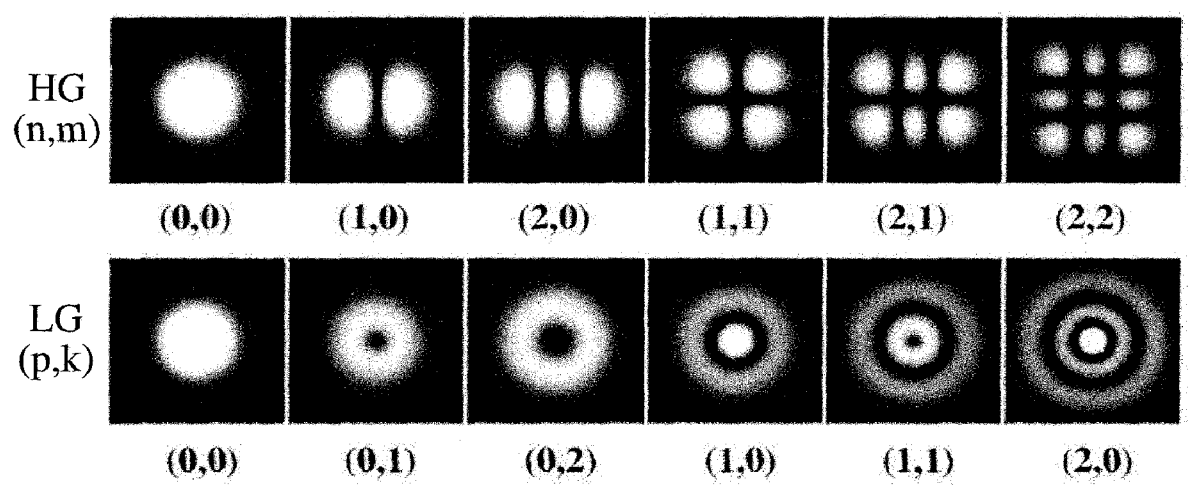
FIG. 2 is a diagram showing examples of light beam patterns of HG mode light and LG mode light, respectively.

FIG. 2 is a diagram showing examples of light beam patterns of HG mode light and LG mode light, respectively. In this figure, light beam patterns of respective transverse modes of HG(0,0), HG(1,0), HG(2,0), HG(1,1), HG(2,1), and HG(2,2) are shown as the HG mode. In addition, light beam patterns of respective transverse modes of LG(0,0), LG(0,1), LG(0,2), LG(1,0), LG(1,1), and LG(2,0) are shown as the LG mode.

Figure 3:
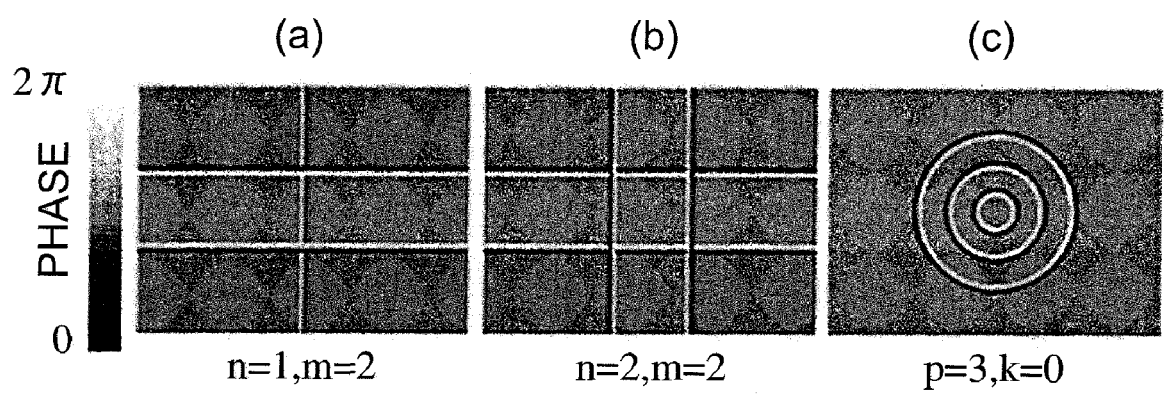
FIG. 3 is a diagram showing examples of a phase variation distribution presented in a second reflection mirror 17 included in the laser light source 1 according to the first embodiment.

FIG. 3 is a diagram showing examples of the phase variation distribution presented to the second reflection mirror 17 included in the laser light source 1 according to the first embodiment. (a) to (c) in FIG. 3, respectively, show the magnitude (0 to $2\pi$) of the phase variation at respective positions on the reflection surface of the second reflection mirror 17, using a contrasting density.

(a) and (b) in FIG. 3 show the phase variation distributions presented in the second reflection mirror 17 to cause the HG mode light to be subjected to laser oscillation. FIG. 3(a) shows the phase variation distribution to cause the HG(1,2) mode light to be subjected to laser oscillation, and FIG. 3(b) shows the phase variation distribution to cause the HG(2,2) mode light to be subjected to laser oscillation.

(c) in FIG. 3 shows the phase variation distribution presented in the second reflection mirror 17 to cause the LG mode light to be subjected to laser oscillation. FIG. 3(c) shows the phase variation distribution to cause the LG(3,0) mode light to be subjected to laser oscillation.

The phase variation distribution presented in the second reflection mirror 17 for the HG mode light is different from that for the LG mode light. If the index n or index m differs, even in the case of the HG mode light, the phase variation distribution presented in the second reflection mirror 17 differs. In addition, if the radial index p or the angular index k differs, even in the case of the LG mode light, the phase variation distribution presented in the second reflection mirror 17 differs.

However, in any of the HG(n,m) mode light and the LG(p,k) mode light, it is common in that, regardless of the indexes, a phase variation distribution, which gives a loss to the light, is used in a predetermined region including a node in which the light intensity becomes zero in the transverse mode to be subjected to oscillation (hereinafter called a "loss region"), and further, a phase variation distribution, by which light is reflected at a high reflectance, is used in a region other than the above-described loss region (hereinafter called a "reflection region").

Giving a loss to light in the loss region means lowering of light intensity in a region corresponding to the loss region on the beam section of light reflected by the second reflection mirror 17 and made incident into the laser medium 12. In detail, this includes absorbing light incident into the loss region, scattering light incident into the loss region, and reflecting or diffracting light incident into the loss region in the direction not contributing to stimulated emission in the laser medium 12.

FIG. 4 is a diagram showing an example of a phase variation distribution in the loss region of the phase variation distribution presented to the second reflection mirror 17 included in the laser light source 1 according to the first embodiment. (a) in FIG. 4 shows the magnitude (0 to $2\pi$) of the phase variation at respective positions in a certain range including the loss region, using a contrasting density. Further, (b) in FIG. 4 shows the phase variation distribution with the horizontal axis used for the position and the vertical axis used for the phase variation. In FIG. 4(b), a region of width L is the loss region, and the region other than the loss region is the reflection region.

As shown in FIG. 4, since the phase variation at respective positions in the reflection region is a fixed value (for example, $\pi$), the light 32 incident into the reflection region is almost regularly reflected, and the reflected light 33 is made incident into the laser medium 12. On the other hand, since the phase variation at respective positions in the loss region changes stepwise in one direction, the light 34 incident into the loss region is reflected in a direction differing from the regular reflection direction, and the reflected light 35 is not made incident into the laser medium 12.

Figure 5:
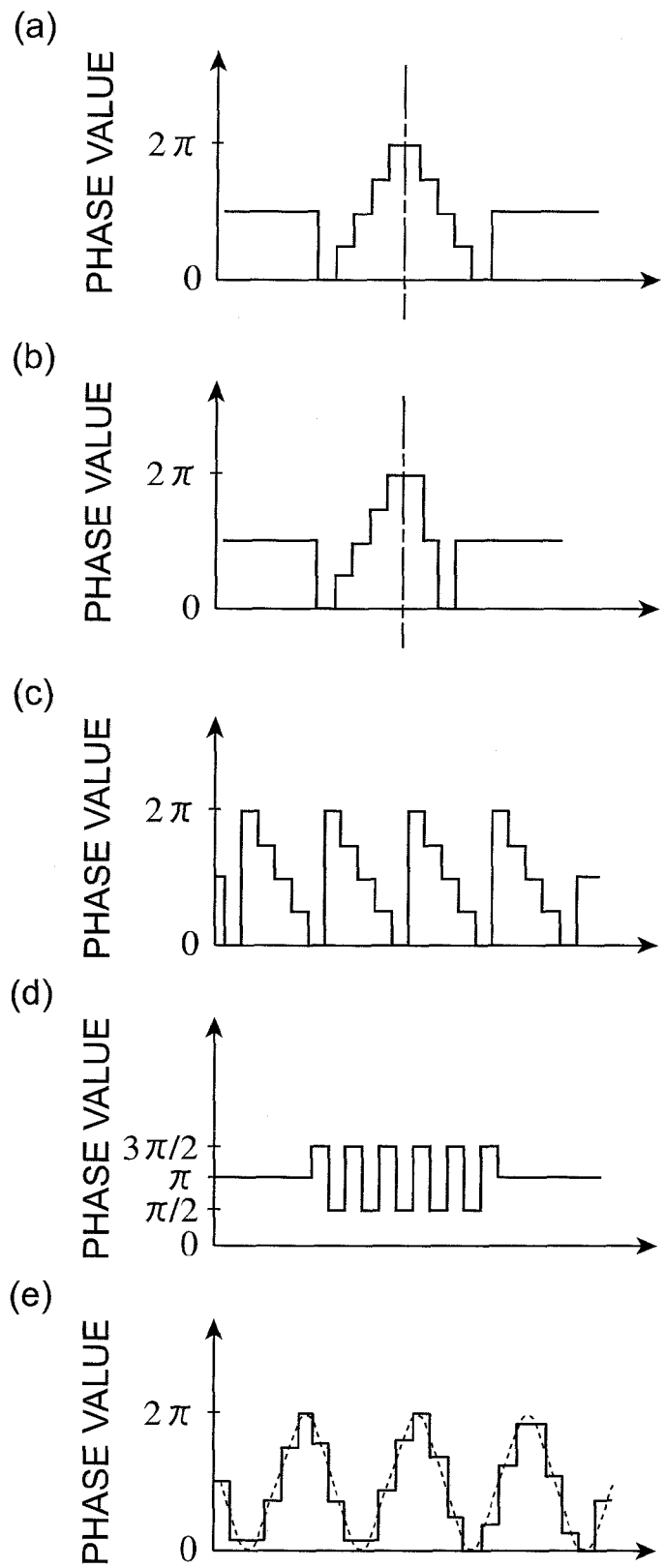
FIG. 5 is a diagram showing other examples of the phase variation distribution in the loss region of the phase variation distribution presented in the second reflection mirror 17 included in the laser light source 1 according to the first embodiment.

FIG. 5 is a diagram showing other examples of the phase variation distribution in the loss region of the phase variation distribution presented in the second reflection mirror 17 included in the laser light source 1 according to the first embodiment. (a) to (e) in FIG. 5, respectively, show the phase variation distributions with the horizontal axis used for the position and the vertical axis used for the phase variation.

In the phase variation distributions in the loss region shown in (a) and (b) in FIG. 5, respectively, the phase variation changes stepwise in both directions, and the incident light is reflected in two directions differing from the regular reflection direction. In the phase variation distribution in the loss region shown in FIG. 5(a), the light is reflected in two directions which are symmetrical to each other. Further, in the phase variation distribution in the loss region shown in FIG. 5(b), the light is reflected in two directions which are asymmetrical to each other.

The phase variation distribution in the loss region shown in (c) in FIG. 5 is such that the change repetition period in the phase variation distribution shown in (b) in FIG. 4 is shortened, and at the same time, the number of times of change repetition is increased. This is a phase distribution referred to as a blazed diffraction grating, and diffracts the incident light in a direction differing from the regular reflection direction. The change repetition period in the phase variation distribution shown in (a) or (b) in FIG. 5 may be shortened, and the number of times of change repetition therein may be increased, and thereby the phase distribution of the blazed diffraction grating may be brought about.

In the phase variation distributions in the loss region shown in (d) and (e) in FIG. 5, respectively, the phase variation at respective positions periodically changes, and the distribution is a periodic phase distribution, which has a function equivalent to the reflection type diffraction grating. In the phase variation distribution in the loss region shown in FIG. 5(d), the phase variations of respective pixels take any one of two values. Further, in the phase variation distribution in the loss region shown in FIG. 5(e), the phase variations of respective pixels are made into values approximate to values of a sine function (dashed line in the figure) using the position as a variable. These diffract the incident light in a direction differing from the regular reflection direction.

Further, in the case where the second reflection mirror 17 is an LCOS type SLM, the second reflection mirror 17 can present only the phase variation distribution. Thus, in the case where the second reflection mirror 17 can present only the phase variation distribution, it is preferable that, when the phase variation distribution in the loss region is Fourier-transformed in terms of the spatial frequency, the component of spatial frequency 0 included in the Fourier transform result is 50% or less. In addition, in the case where the second reflection mirror 17 can present only the amplitude variation distribution, it is preferable that the reflectance in the loss region is 50% or less with respect to the reflectance in the reflection region. Furthermore, in the case where the second reflection mirror 17 can present both the amplitude variation distribution and the phase variation distribution, it is preferable that the reflectance to the regular reflection direction in the loss region is 50% or less with respect to the reflectance in the reflection region.

Figure 6:
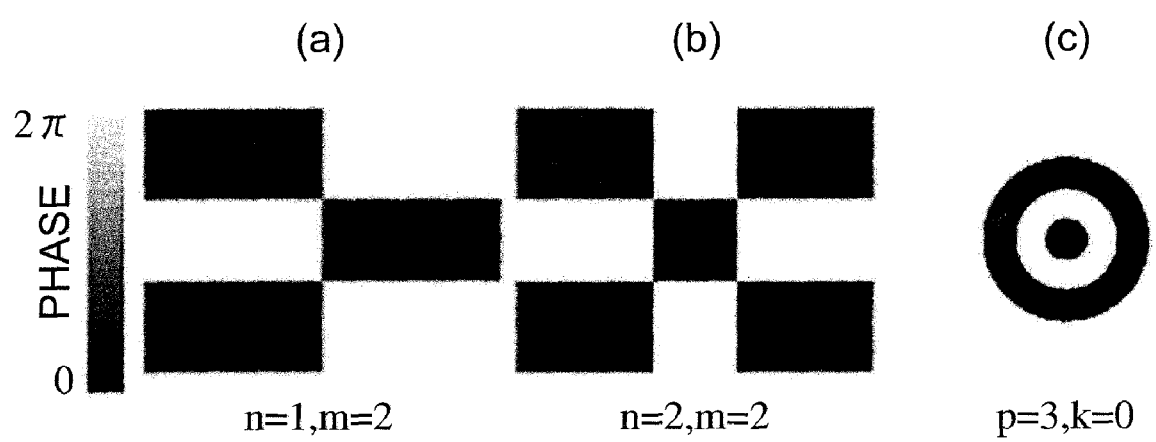
FIG. 6 is a diagram showing other examples of the phase variation distribution presented in the second reflection mirror 17 included in the laser light source 1 according to the first embodiment.

FIG. 6 is a diagram showing other examples of the phase variation distribution presented in the second reflection mirror 17 included in the laser light source 1 according to the first embodiment. (a) in FIG. 6 shows the phase variation distribution to cause the HG(1,2) mode light to be subjected to laser oscillation, (b) in FIG. 6 shows the phase variation distribution to cause the HG(2,2) mode light to be subjected to laser oscillation, and (c) in FIG. 6 shows the phase variation distribution to cause the LG(3,0) mode light to be subjected to laser oscillation.

In the examples shown in (a) to (c) in FIG. 6, respectively, the magnitude of phase variation at respective positions on the reflection surface of the second reflection mirror 17 is 0 or 2π. The respective regions in which the phase variation is 0 or 2π are shown with black regions and white regions. In the case where the LCOS type SLM is used as the second reflection mirror 17, since the SLM has a pixel structure and has definite resolution, a narrow and steep phase variation distribution is formed at the boundary between two regions the phase variations of which are different by 2π from each other, thereby effects similar to those of the above-described loss region can be brought about.

Figure 7:
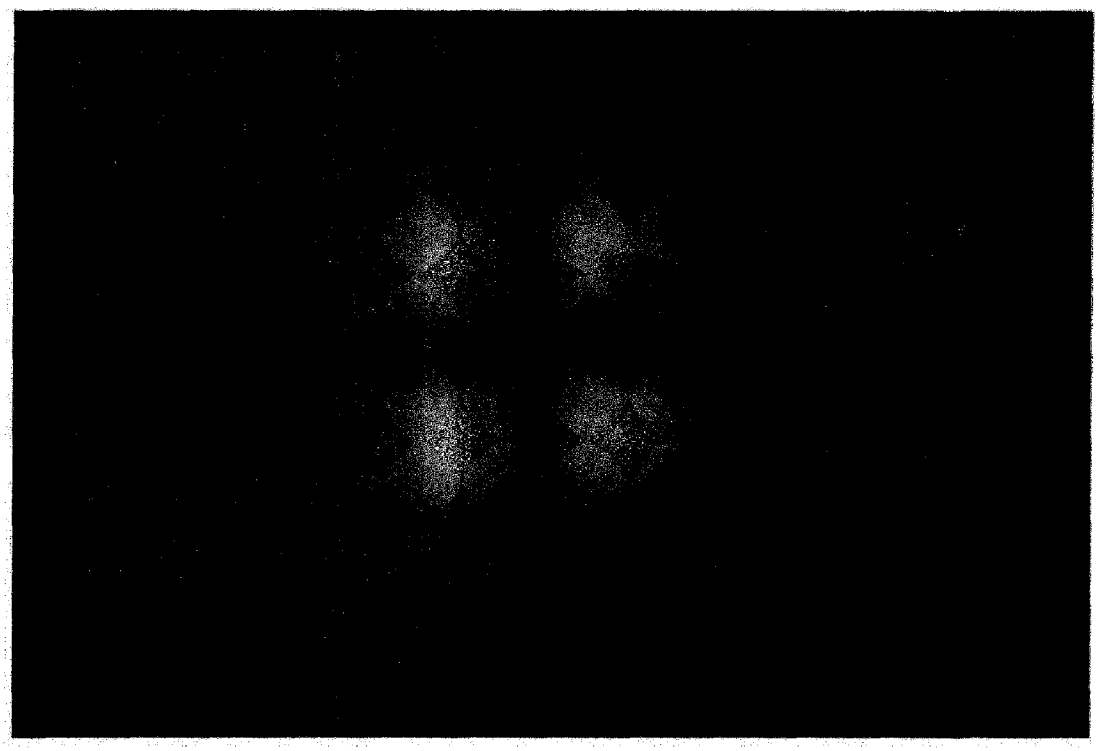
FIG. 7 is a diagram showing an example of a light intensity profile of laser oscillation light 31 output from the laser light source 1 according to the first embodiment.

FIG. 7 is a diagram showing an example of a light intensity profile of the laser oscillation light 31 output from the laser light source 1 according to the first embodiment. FIG. 7 shows an example of the light intensity profile of the HG (1,1) mode light. Thus, the laser oscillation light 31 of a specific transverse mode can be obtained.

As described above, in the present embodiment, by presenting the amplitude or phase variation distribution in the second reflection mirror 17, the transverse mode of the stimulated emission light generated in the laser light source 1 is efficiently selected, and the laser oscillation light 31 having the transverse mode is output from the half mirror 15 to the outside. In the present embodiment, since the amplitude or phase variation distribution is controlled from the outside and is presented in the second reflection mirror 17, it is possible to easily obtain the laser oscillation light 31 having a desired transverse mode. In addition, since the node portion in which the light intensity becomes zero in the transverse mode can be appropriately set in accordance with the beam diameter and beam shape of the laser oscillation light 31, the laser oscillation light 31 of a certain specific transverse mode can be efficiently obtained.

Further, in the present embodiment, it is preferable that, in addition to the amplitude or phase variation distribution for determining the transverse mode of the laser oscillation light 31, the second reflection mirror 17 overlaps and presents the phase variation distribution, which compensates for the phase distortion resulting from the optical elements (laser medium 12, output mirror 14, half mirror 15, light beam diameter adjuster 16) in the main resonator or the external resonator, and it is also preferable that the second reflection mirror overlaps and presents the phase variation distribution, which operates as a concave mirror, and further, it is also preferable that, in the case where the reflection surface of the second reflection mirror 17 is inclined with respect to the plane perpendicular to the optical axis of the external resonator, the second reflection mirror overlaps and presents the phase variation distribution to compensate for the inclination. In such cases, since the phase variation distribution is presented in the second reflection mirror 17 by being controlled from the outside, it is possible to efficiently obtain the laser oscillation light 31 of a certain specific transverse mode.

In addition, in the present embodiment, in order to efficiently obtain the laser oscillation light 31 of a certain specific transverse mode, it is possible to feedback control the amplitude or phase variation distribution, which is presented in the second reflection mirror 17, based on the light intensity profile obtained by monitoring the light intensity profile of the laser oscillation light 31.

Second Embodiment

Figure 8:
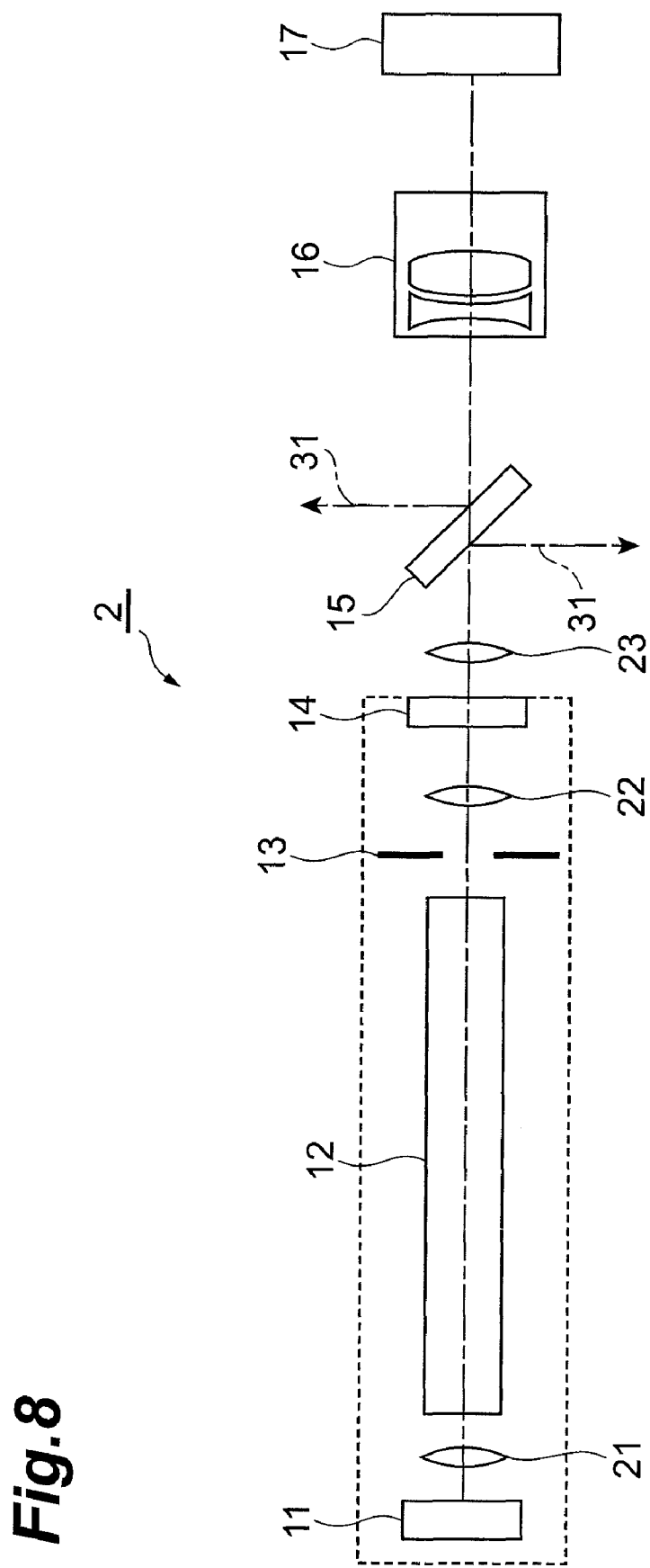
FIG. 8 is a configuration diagram of a laser light source 2 according to a second embodiment.

FIG. 8 is a configuration diagram of a laser light source 2 according to a second embodiment. The laser light source 2 of the second embodiment shown in this figure is further provided with cylindrical lenses 21 to 23 in addition to the configuration of the laser light source 1 of the first embodiment shown in FIG. 1. The laser light source 2 has a favorable configuration for outputting LG mode light, the angular index k of which is not zero, (that is, LG mode light having a spiral structure of phase in the section of the light beam) as the laser oscillation light 31.

The cylindrical lens 21 is provided between the first reflection mirror 11 and the laser medium 12. The distance between the cylindrical lens 21 and the first reflection mirror 11 is equal to the focal distance of the cylindrical lens 21. The cylindrical lens 22 and the cylindrical lens 23 are provided with the output mirror 14 placed therebetween. The respective focal lines of the cylindrical lens 22 and the cylindrical lens 23 are coincident with each other. The distance between the cylindrical lens 22 and the output mirror 14 is equal to the focal distance of the cylindrical lens 22. In addition, the distance between the cylindrical lens 23 and the output mirror 14 is equal to the focal distance of the cylindrical lens 23. The second reflection mirror 17 gives the phase variation distribution, the winding number of which is −2k, to the reflected light.

Figure 9:
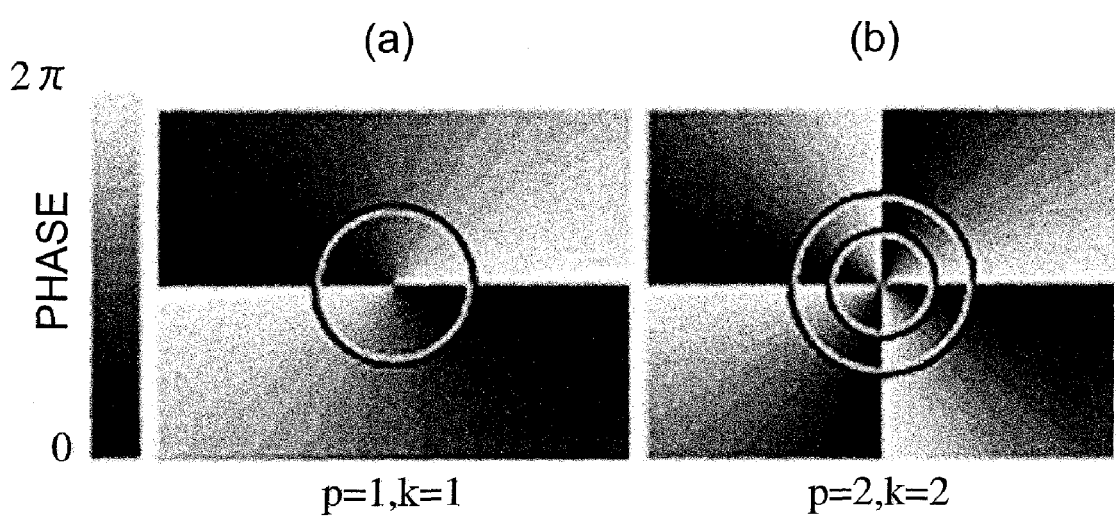
FIG. 9 is a diagram showing examples of a phase variation distribution presented in a second reflection mirror 17 included in the laser light source 2 according to the second embodiment.

FIG. 9 is a diagram showing examples of the phase variation distribution presented in the second reflection mirror 17 included in the laser light source 2 according to the second embodiment. (a) and (b) in FIG. 9, respectively, show the magnitude (0 to 2π) of the phase variation at respective positions on the reflection surface of the second reflection mirror 17, using a contrasting density. FIG. 9(a) shows the phase variation distribution to cause the LG(1,1) mode light to be subjected to laser oscillation, wherein a predetermined region including one circumference is made into a loss region, and in two reflection regions sectioned by the loss region, respectively, a phase variation distribution of a spiral structure in which the winding number is −2 is used. In addition, FIG. 9(b) shows the phase variation distribution to cause the LG(2,2) mode light to be subjected to laser oscillation, wherein predetermined regions respectively including two circumferences are made into loss regions, and in three reflection regions sectioned by these two loss regions, respectively, a phase variation distribution of a spiral structure in which the winding number is −4 is used.

In the laser light source 2 which outputs LG(p,k) mode light as the laser oscillation light 31, the phase variation distribution, which is presented in the second reflection mirror 17, is generally expressed as follows. p positive real number roots $a_1$ to $a_p$ of the Sonine polynomial $S_p^k(z)$ of the p-order polynomial shown by the following equation (1) are obtained, and the radii $r_1$ to $r_p$ of the circumferences at the loss regions are obtained in accordance with the following equation (2) based on these real number roots $a_1$ to $a_p$ and the light beam waist radius w. Regions having a certain width, which include the circumferences of respective radii $r_i$ (i=1 to p), are made into the loss regions, and the phase variation distribution in the radial direction at the respective loss regions is made into the distribution as shown in FIG. 4 or FIG. 5. In addition, in the (p+1) reflection regions sectioned by the p loss regions, respectively, the phase variation φ(r, θ) is expressed by the following equation (3). r and θ are a radial variable and an angular variable in the polar coordinate system set on the reflection surface of the second reflection mirror 17.

[Equation 1]
$$S_p^k(z) = \sum_{j=0}^{p} \frac{(-1)^j \cdot (p+|k|)!}{(p-j)! \cdot (|k|+j)! \cdot j!} \cdot z^j \quad (1)$$

[Equation 2]
$$r_i = w\sqrt{\frac{a_i}{2}} \quad (i = 1, 2, \ldots, p) \quad (2)$$

[Equation 3]
$$\phi(r, \theta) = -2k\theta \quad (3)$$

Here, when n is an integer number, an arbitrary phase α and a phase (α+2nπ) are equivalent to each other, and the phase variation distribution may be based on only the relative value with the offset value disregarded. Taking these into consideration, in the phase variation distribution presented at the second reflection mirror 17, it is possible to restrict the phase variation to the range from phase a to phase (α+2π), and further, the value of α may be zero.

Further, in the present embodiment, as in the phase variation distribution shown in FIG. 6, the phase variation distribution in which the phase difference between the inside of the circumference of the respective radius $r_i$ and the outside thereof becomes 2π may be presented in the second reflection mirror 17.

The laser light source 2 according to the second embodiment carries out actions almost similar to those of the laser light source 1 according to the first embodiment, and can bring about similar effects. However, the laser light source 2 according to the second embodiment operates as described below by using FIG. 10, with respect to the configuration in which the phase variation distribution in which the winding number is −2k as shown in the equation (3) described above is presented in the second reflection mirror 17, and the cylindrical lenses 21 to 23 are provided.

Figure 10:
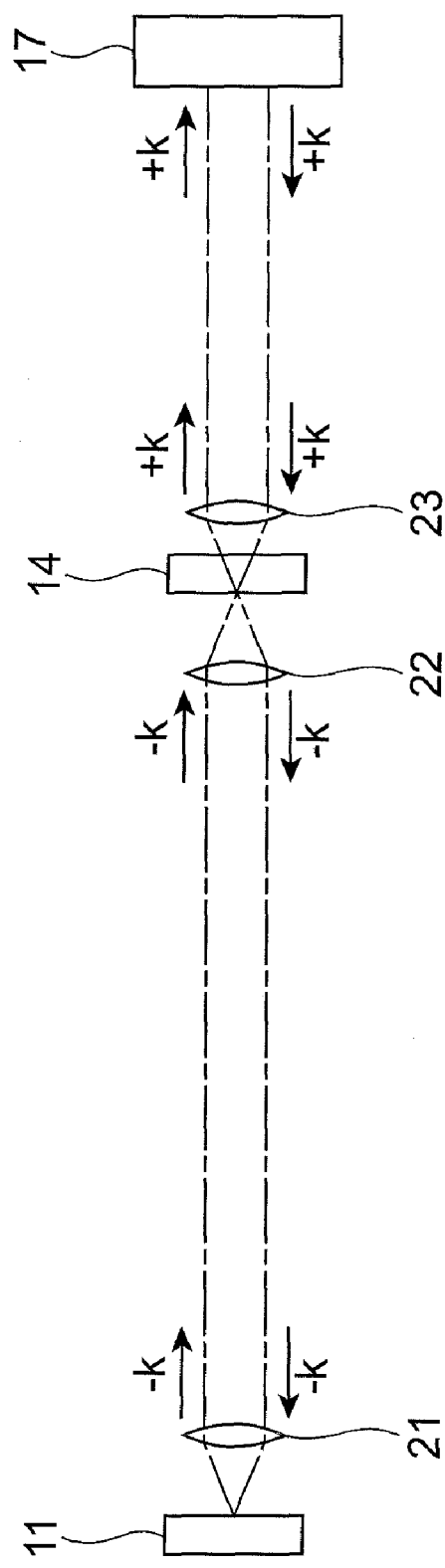
FIG. 10 is a diagram describing the operation of the laser light source 2 according to the second embodiment.

FIG. 10 is a diagram describing the operation of the laser light source 2 according to the second embodiment. FIG. 10 shows the first reflection mirror 11, the output mirror 14, the second reflection mirror 17 and the cylindrical lenses 21 to 23, and shows stimulated emission light and the angular index (+k or −k) thereof in the main resonator and the external resonator, respectively.

If light incident on the first reflection mirror 11 in the main resonator is LG(p,−k) mode light, the light is collimated by the cylindrical lens 21 after it is condensed onto the reflection surface of the first reflection mirror 11 by the cylindrical lens 21 when the light enters the first reflection mirror and is reflected by the first reflection mirror 11, whereby the traveling direction of the reflected light after being collimated is reversed, and the phase distribution thereof is line-symmetrically transformed, and therefore, the LG(p,−k) mode is maintained as it is.

If light incident on the output mirror 14 in the main resonator is LG(p,−k) mode light, the light is collimated by the cylindrical lens 22 after it is condensed onto the reflection surface of the output mirror 14 by the cylindrical lens 22 when the light enters the output mirror and is reflected by the output mirror 14, whereby the traveling direction of the reflected light after collimated is reversed, and the phase distribution thereof is line-symmetrically transformed, and therefore, the LG(p,−k) mode is maintained as it is. However, the light which transmits from the main resonator through the output mirror 14 and advances to the external resonator becomes LG(p,+k) mode light by passing through the two cylindrical lenses 22 and 23.

If light incident on the second reflection mirror 17 in the external resonator is LG(p,+k) mode light, the traveling direction of the reflected light reflected by the second reflection mirror 17 is reversed, and is given a phase variation in accordance with the above-described phase variation distribution, wherein the LG(p,+k) mode is maintained as it is.

Further, if light incident on the output mirror 14 in the external resonator is LG(p,+k) mode light, the light is collimated by the cylindrical lens 23 after it is condensed onto the reflection surface of the output mirror 14 by the cylindrical lens 23 when the light enters the output mirror and is reflected by the output mirror 14, whereby the traveling direction of the reflected light after being collimated is reversed, and the phase distribution is line-symmetrically transformed, wherein the LG(p,+k) mode is maintained as it is. However, the light advancing to the main resonator after transmitting from the external resonator through the output mirror 14 becomes LG(p,−k) mode light by passing through the two cylindrical lenses 23 and 22.

Thus, the LG(p,−k) mode becomes a stationary mode in the main resonator, and the LG(p,+k) mode becomes a stationary mode in the external resonator. Further, the laser oscillation light 31 which is reflected by the half mirror 15 inserted in the external resonator and is output to the outside is brought into the LG(p,+k) mode. Thus, the LG(p,+k) mode light is subjected to laser oscillation.

Further, in the second embodiment, it is preferable that, in addition to the amplitude or phase variation distribution for determining the transverse mode of the laser oscillation light 31, the second reflection mirror 17 overlaps and presents the phase variation distribution, which compensates for the phase distortion resulting from optical elements (the laser medium 12, the output mirror 14, the half mirror 15, the light beam diameter adjuster 16, the cylindrical lenses 21 to 23) in the main resonator or the external resonator, and it is also preferable that the second reflection mirror overlaps and presents the phase variation distribution, which operates as a concave mirror, and further, it is also preferable that, in the case where the reflection surface of the second reflection mirror 17 is inclined with respect to the plane perpendicular to the optical axis of the external resonator, the second reflection mirror overlaps and presents the phase variation distribution to compensate for the inclination. In such cases, since the phase variation distribution is presented in the second reflection mirror 17 by being controlled from the outside, it is possible to efficiently obtain the laser oscillation light 31 of a certain specific transverse mode.

In addition, in the second embodiment, in order to efficiently obtain the laser oscillation light 31 of a certain specific transverse mode, it is possible to feedback control the amplitude or phase variation distribution, which is presented in the second reflection mirror 17, based on the light intensity profile obtained by monitoring the light intensity profile of the laser oscillation light 31.

Although the laser light source 2 according to the second embodiment has a favorable configuration for outputting the LG mode light, the angular index k of which is not zero, as the laser oscillation light 31, it is possible to output the LG mode light, the angular index k of which is zero, as the laser oscil-lation light 31, and it is also possible to output the HG mode light as the laser oscillation light 31.

Third Embodiment

Figure 11:
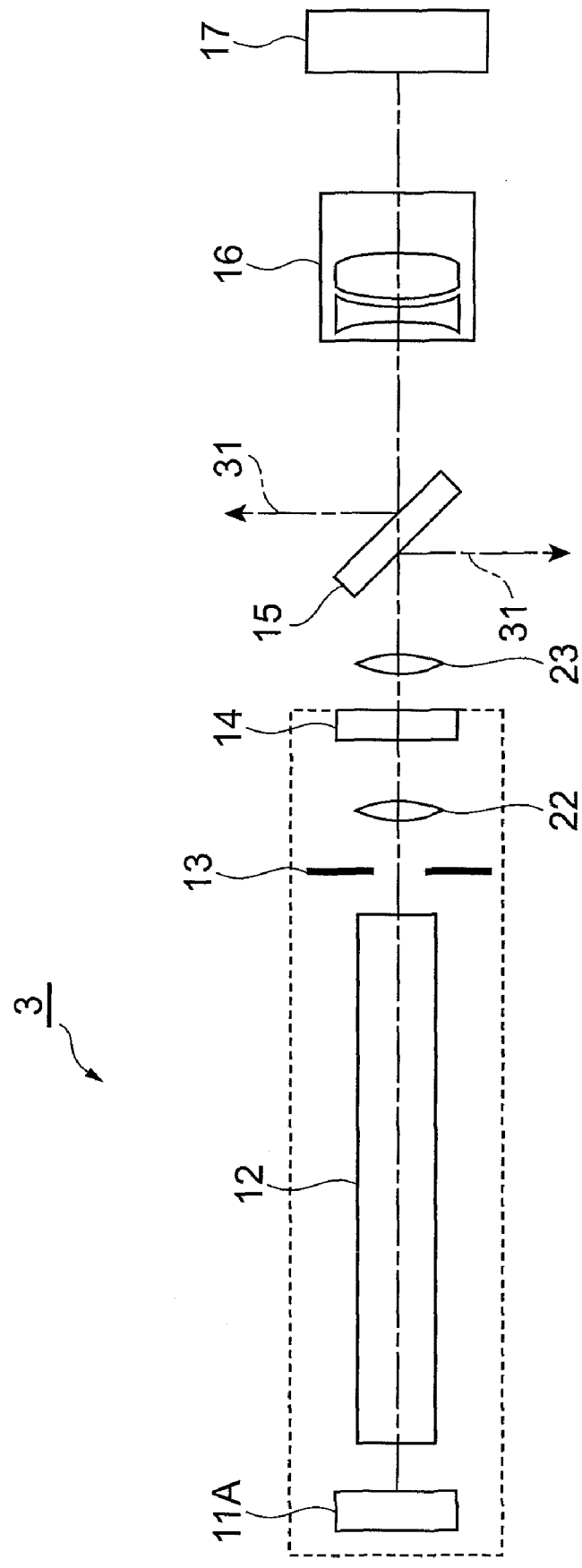
FIG. 11 is a configuration diagram of a laser light source 3 according to a third embodiment.

FIG. 11 is a configuration diagram of a laser light source 3 according to a third embodiment. The laser light source 3 of the third embodiment shown in the figure is provided with a first reflection mirror 11A instead of the first reflection mirror 11 and the cylindrical lens 21 in the configuration of the laser light source 2 of the second embodiment shown in FIG. 8. The first reflection mirror 11A and the output mirror 14 compose the main resonator with the laser medium 12 placed therebetween.

As in the second reflection mirror 17, the first reflection minor 11A is configured such that it gives amplitude or phase variations to respective positions in the section of the light beam when the light is reflected, the first reflection mirror presents an amplitude or phase variation distribution, and determines the transverse mode of the laser oscillation light 31 based on the amplitude or phase variation distribution. The amplitude or phase variation distribution presented by the first reflection mirror 11A may be fixed, however, it is preferable that the first reflection mirror presents the amplitude or phase variation distribution in accordance with control from the outside.

The first reflection mirror 11A may be an SLM which spatially modulates the amplitude or phase of the incident light and reflects the incident light, and may be a segment type deformable mirror or a MEMS element which spatially modulates the phase of the incident light and reflects the incident light. Further, it is preferable that the first reflection mirror 11A is an LCOS type SLM among the SLMs.

The amplitude or phase variation distribution presented in the first reflection mirror 11A has a mirror image relationship with respect to the amplitude or phase variation distribution presented in the second reflection mirror 17. For example, in the case where the LG (p,k) mode light is made into the laser oscillation light 31, if the phase variation $\phi(r, \theta)$ in the reflection region of the second reflection mirror 17 is expressed by the above-described equation (3), the phase variation $\phi(r, \theta)$ in the reflection region of the first reflection mirror 11A is expressed by the following equation (4).

[Equation 4]

$$\phi(r,\theta) = +2k\theta \qquad (4)$$

By using the first reflection mirror 11A like this, if light incident on the first reflection mirror 11A in the main resonator is LG(p,−k) mode light, the light reflected by the first reflection mirror 11A reverses its traveling direction, and a phase variation is given thereto in accordance with the above-described phase variation distribution, wherein the LG(p,−k) mode is maintained as it is.

Thus, even in the present embodiment, the LG(p,−k) mode becomes a stationary mode in the main resonator, and the LG(p,+k) mode becomes a stationary mode in the external resonator. Further, the laser oscillation light 31, which is reflected by the half mirror 15 inserted in the external resonator and is output to the outside becomes the LG(p,+k) mode. Thus, the LG(p,+k) mode light is subjected to laser oscillation.

Although the laser light source 3 according to the third embodiment has a favorable configuration for outputting the LG mode light, the angular index k of which is not zero, as the laser oscillation light 31, it is possible to output the LG mode light, the angular index k of which is zero, as the laser oscillation light 31, and it is also possible to output the HG mode light as the laser oscillation light 31.

Fourth Embodiment

Figure 12:
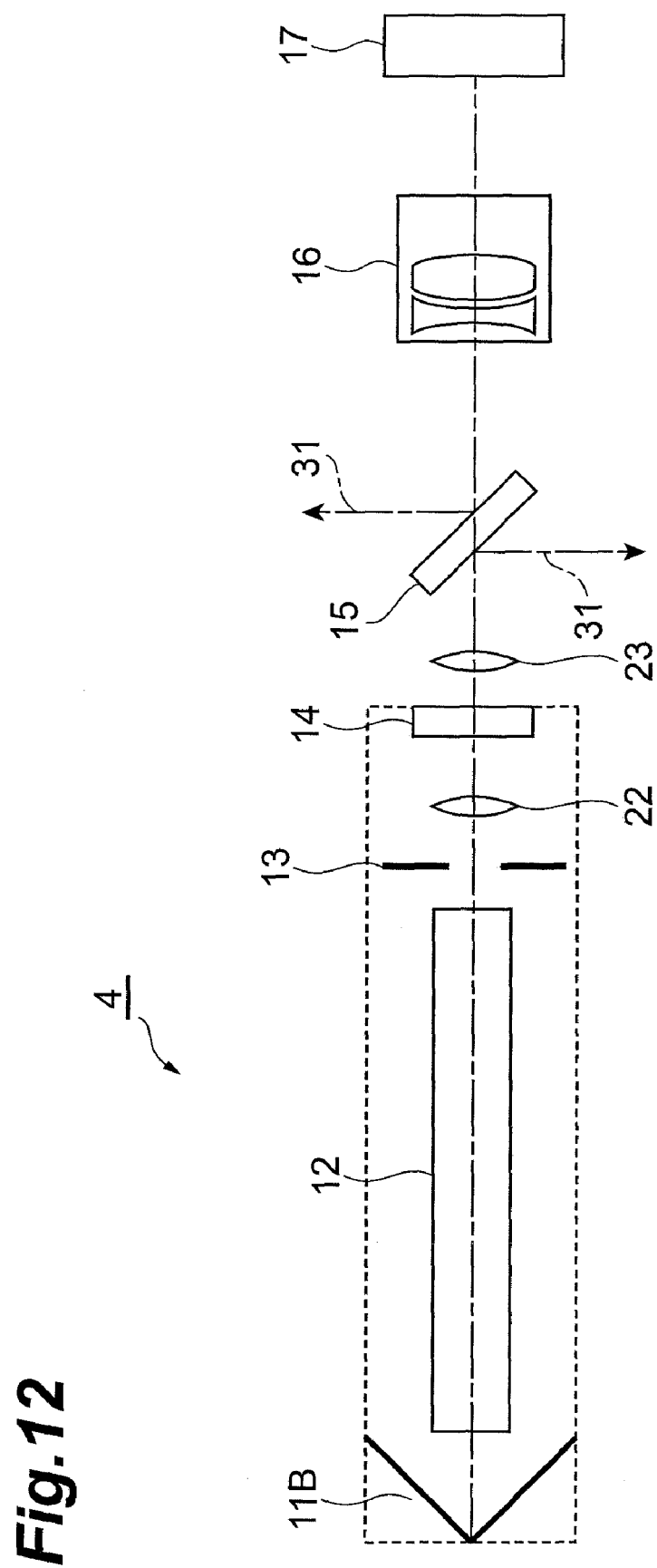
FIG. 12 is a configuration diagram of a laser light source 4 according to a fourth embodiment.

FIG. 12 is a configuration diagram of a laser light source 4 according to a fourth embodiment. The laser light source 4 of the fourth embodiment shown in the figure is provided with a first reflection mirror 11B instead of the first reflection mirror 11 and the cylindrical lens 21 in the configuration of the laser light source 2 of the second embodiment shown in FIG. 8. The first reflection mirror 11B and the output mirror 14 compose the main resonator with the laser medium 12 placed therebetween. The first reflection mirror 11B has two reflection surfaces perpendicular to each other, wherein, for example, a two-dimensional retroreflector (prism) having two surfaces orthogonal to each other as the reflection surfaces is used.

By using the first reflection mirror 11B like this, if light incident on the first reflection mirror 11B in the main resonator is LG(p,−k) mode light, the light reflected by the first reflection mirror 11B reverses its traveling direction, and the phase distribution is line-symmetrically transformed, wherein the LG(p,−k) mode is maintained as it is.

Thus, even in the present embodiment, the LG(p,−k) mode becomes a stationary mode in the main resonator, and the LG(p,+k) mode becomes a stationary mode in the external resonator. Further, the laser oscillation light 31, which is reflected by the half mirror 15 inserted in the external resonator and is output to the outside becomes the LG(p,+k) mode. Thus, the LG(p,+k) mode light is subjected to laser oscillation.

Although the laser light source 4 according to the fourth embodiment has a favorable configuration for outputting the LG mode light, the angular index k of which is not zero, as the laser oscillation light 31, it is possible to output the LG mode light, the angular index k of which is zero, as the laser oscillation light 31, and it is also possible to output the HG mode light as the laser oscillation light 31.

Here, a laser light source according to the present embodiments is provided with (1) a main resonator configured so that the first reflection mirror and the output mirror are disposed so as to be opposed to each other with a laser medium placed therebetween, and (2) an external resonator configured so that the output mirror and the second reflection mirror are disposed so as to be opposed to each other, which is optically coupled to the main resonator via the output mirror. Further, the second reflection mirror is configured such that it gives amplitude or phase variations responsive to respective positions in the section of a light beam when the light is reflected, and the second reflection mirror presents an amplitude or phase variation distribution, and determines a transverse mode of laser oscillation light based on the amplitude or phase variation distribution. In the laser light source according to this configuration, since the amplitude or phase variation distribution is presented in the second reflection mirror, the transverse mode of the stimulated emission light efficiently generated in the main resonator and the external resonator of the laser light source is determined, and the laser oscillation light having the transverse mode is output to the outside.

It is preferable that the laser light source having the above-described configuration is further provided with a light beam diameter adjuster which is provided on the resonance light path in the main resonator or in the external resonator and adjusts the beam diameter of light incident on the second reflection mirror. In addition, it is preferable that the laser light source is further provided with an aperture which is provided on the resonance light path in the main resonator or in the external resonator and restricts the beam diameter of light incident on the second reflection mirror.

In the laser light source having the above-described configuration, it is preferable that the second reflection mirror overlaps and presents a phase variation distribution, which compensates for the phase distortion resulting from optical elements in the main resonator or in the external resonator, in addition to the amplitude or phase variation distribution which determines the transverse mode of the laser oscillation light. Also, it is preferable that the second reflection mirror overlaps and presents a phase variation distribution, which operates as a concave mirror, in addition to the amplitude or phase variation distribution which determines the transverse mode of the laser oscillation light.

In the laser light source, it is preferable that the second reflection mirror presents the amplitude or phase variation distortion to cause the Laguerre-Gauss mode light to be subjected to laser oscillation. Further, it is preferable that the second reflection mirror presents the amplitude or phase variation distribution to cause the Hermite-Gauss mode light to be subjected to laser oscillation.

Further, in the laser light source having the above-described configuration, it is preferable that the second reflection mirror presents the amplitude or phase variation distribution in accordance with control from the outside.

INDUSTRIAL APPLICABILITY

The present invention is applicable as a laser light source capable of easily controlling the transverse mode of laser oscillation light.

REFERENCE SIGNS LIST

1 to 4—Laser light source, 11, 11A, 11B—First reflection mirror, 12—Laser medium, 13—Aperture, 14—Output mirror, 15—Half mirror, 16—Light beam diameter adjuster, 17—Second reflection mirror, 21 to 23—Cylindrical lens, 31—Laser oscillation light.

The invention claimed is:

1. A laser light source comprising:
   a main resonator configured so that a first reflection mirror and an output mirror are disposed so as to be opposed to each other with a laser medium placed therebetween; and
   an external resonator configured so that the output mirror and a second reflection mirror are disposed so as to be opposed to each other, which is optically coupled to the main resonator via the output mirror;
   wherein the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution, and
   the laser light source further comprising a light beam diameter adjuster which is provided on the resonance light path in the main resonator or in the external resonator and adjusts the beam diameter of light incident on the second reflection mirror.

2. A laser light source comprising:
   a main resonator configured so that a first reflection mirror and an output mirror are disposed so as to be opposed to each other with a laser medium placed therebetween; and an external resonator configured so that the output mirror and a second reflection mirror are disposed so as to be opposed to each other, which is optically coupled to the main resonator via the output mirror;

wherein the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution, and the laser light source further comprising an aperture which is provided on the resonance light path in the main resonator or in the external resonator and restricts the beam diameter of light incident on the second reflection mirror.

3. A laser light source comprising:

a main resonator configured so that a first reflection mirror and an output mirror are disposed so as to be opposed to each other with a laser medium placed therebetween; and an external resonator configured so that the output mirror and a second reflection mirror are disposed so as to be opposed to each other, which is optically coupled to the main resonator via the output mirror;

wherein the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution, and wherein the second reflection mirror overlaps and presents a phase variation distribution, which compensates for the phase distortion resulting from optical elements in the main resonator or in the external resonator, in addition to the amplitude or phase variation distribution which determines the transverse mode of the laser oscillation light.

4. A laser light source comprising:

a main resonator configured so that a first reflection mirror and an output mirror are disposed so as to be opposed to each other with a laser medium placed therebetween; and an external resonator configured so that the output mirror and a second reflection mirror are disposed so as to be opposed to each other, which is optically coupled to the main resonator via the output mirror;

wherein the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution, and wherein the second reflection mirror overlaps and presents a phase variation distribution, which operates as a concave mirror, in addition to the amplitude or phase variation distribution which determines the transverse mode of the laser oscillation light.

5. The laser light source according to claim 1, wherein the second reflection mirror presents the amplitude or phase variation distribution to cause Laguerre-Gauss mode light to be subjected to laser oscillation.

6. The laser light source according to claim 1, wherein the second reflection mirror presents the amplitude or phase variation distribution to cause Hermite-Gauss mode light to be subjected to laser oscillation.

7. A laser light source comprising:

a main resonator configured so that a first reflection mirror and an output mirror are disposed so as to be opposed to each other with a laser medium placed therebetween; and an external resonator configured so that the output mirror and a second reflection mirror are disposed so as to be opposed to each other, which is optically coupled to the main resonator via the output mirror;

wherein the second reflection mirror is configured such that it gives amplitude or phase variations to respective positions in the section of a light beam when the light is reflected, the second reflection mirror presents an amplitude or phase variation distribution, and determines a transverse mode of laser oscillation light based on the amplitude or phase variation distribution, and wherein the second reflection mirror presents the amplitude or phase variation distribution in accordance with control from the outside.

8. The laser light source according to claim 2, wherein the second reflection mirror presents the amplitude or phase variation distribution to cause Laguerre-Gauss mode light to be subjected to laser oscillation.

9. The laser light source according to claim 2, wherein the second reflection mirror presents the amplitude or phase variation distribution to cause Hermite-Gauss mode light to be subjected to laser oscillation.

\* \* \* \* \*